US007587404B1

(12) United States Patent
Albertelli, Jr.

(10) Patent No.: US 7,587,404 B1
(45) Date of Patent: Sep. 8, 2009

(54) ENHANCED DYNAMIC DECISION SUPPORT PROCESSING USING FUSED MULTIPLE DISPARATE DATA SOURCES

(75) Inventor: Paul D. Albertelli, Jr., Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 801 days.

(21) Appl. No.: 11/032,741

(22) Filed: Jan. 11, 2005

(51) Int. Cl.
*G06F 17/00* (2006.01)

(52) U.S. Cl. ........................................ 707/101; 707/10

(58) Field of Classification Search ..................... 707/1, 707/10, 100, 101, 104.1, 200, 204
See application file for complete search history.

(56) References Cited

OTHER PUBLICATIONS

Jesus Mena, Homeland Security as Catalyst, 2004, Intelligent enterprise, pp. 1-7.*

Barendregt et al., Electronic Communication of Mathematics and the Interaction of Computer Algebra systems and Proof Assistants, 2001, Academic Press, pp. 3-22.*

* cited by examiner

*Primary Examiner*—Fred I Ehichioya
(74) *Attorney, Agent, or Firm*—Duane Morris LLP

(57) ABSTRACT

Processing provides a high level of automated decision support using COTS computing software and hardware. By combining information gathered from multiple structured and unstructured data sources and converting to a common protocol shared with the conditional decision logic, the operator is freed from the task of continually monitoring the situation for compliance with pre-established rules. By organizing the conditional and simulation logic of the system in a hierarchical manner, rules are applied to data-based entities, their interactions, and the overall operational situation, and then to established procedures. The hierarchical organization of the conditional logic permits a high level of control over aggregated complex rule-based processing, and provides dynamic behavior, allowing modifications of the entire system processing to be based on the simplest human interaction or a single change in the state of one data item gathered by the system.

6 Claims, 2 Drawing Sheets

ENHANCED DYNAMIC DECISION SUPPORT PROCESSING USING FUSED MULTIPLE DISPARATE DATA SOURCES

FIELD OF THE INVENTION

This invention relates to the field of information technology for the purpose of assisting human decision making using data from multiple disparate sources.

BACKGROUND OF THE INVENTION

Computer processing is now commonplace. Ordinary computer processing as it now exists commonly requires the input data to be structured to accommodate the software programs being used. For example, a computer using a common word processing application requires keyboard inputs or data in a particular format in order to function properly.

Homeland security is an extremely important field. The complexity of asymmetric threats in a society as complex as ours, and the cost of threat amelioration, have rendered security vulnerable to highly publicized threats. Whenever humans are involved in threat evaluation or situation monitoring, there is the distinct possibility of failure to properly evaluate a threat scenario in which the clues to the threat are distributed among many information sources. Even when the clues are more limited in number, sheer fatigue or boredom may result in inattentiveness, which in turn might allow a threat to materialize. There is just too much data in too many sources for humans to accurately mine through.

The problems of computerized processing of both archived and real-time or current information from disparate sources have been subject to much attention, and the problems with achieving sufficient computing power, accessing all the available data, translating or information extraction from non-English-language text, and the like, have been addressed in the prior art.

Improved methods for aiding human decision making are desired.

SUMMARY OF THE INVENTION

In general, computer processing according to an aspect of the invention provides a high level of automated decision support using commercial off-the-shelf (COTS) computing software and hardware. By combining information gathered from multiple structured and unstructured data sources and converting to a common protocol shared with the conditional decision logic, the operator is freed from the task of continually monitoring the situation for compliance with pre-established rules. By organizing the conditional and simulation logic of the system in a hierarchical manner, rules are applied to data-based entities, their interactions, and the overall operational situation, and then to established procedures. The hierarchical organization of the conditional logic permits a high level of control over aggregated complex rule-based processing, and provides dynamic behavior, allowing modifications of the entire system processing to be based on the simplest human interaction or a single change in the state of one data item gathered by the system.

A method according to another aspect of the invention is for supporting decisions made by humans. The method comprises the steps of accessing data from two or more sources, and if necessary, structuring unstructured data by application of information extraction logic to form structured data. The structured data is or are processed by conversion of the structured data to a common language containing structural and semantic meaning. A particularly advantageous language providing common structure and semantics is Extensible Markup Language (XML). (XML is a meta-markup language designed to describe data and to focus on what data is. XML utilizes the concept of rule-specifying data tags and the use of a tag-processing application which processes these tags. By specifying simple but strict standards defining the meta-syntax, XML-based field-specific markup languages may be used for data processing. An XML variant especially developed for the specific application of this concept may also be employed; however, XML implementations specified by the user organization may be easily adapted.) A computerized common-structured-language-based conditional decision logic processing is configured to seek particular conditions or states of data. In the context of homeland security, such information might have to do with particular items in the reported lading of ships about to enter a particular harbor, in conjunction with a particular recent port of call and the country of registry of the ship. The structured data in common-structured-language is applied to the common-structured-language-based conditional decision logic processing to thereby generate an indication of the condition being met.

According to an aspect of the invention, a method for supporting decisions made by humans comprises the steps of accessing data from two or more sources, and, if the data so acquired includes unstructured data, structuring the unstructured data by application of information extraction logic. Thus, all the acquired data is or are structured. If the structured data is (are) not in a common structured language, the structured data is processed by conversion of the structured data to a common structured language. In a preferred embodiment of this aspect of the invention, the preferred common language is XML. (XML indicates or connotes different categories of meaning, such as structural, semantic and stylistic. "Structure" specifies relationships between elements within an XML document, facilitating use of existing relational database schemas. "Semantic meaning" is manifested in the mind of the human system operators, therefore data tags that reflect the logical meaning of the element are specified in the XML implementation. The automated system processes the XML data tags based upon the rules underlying the logic. "Stylistic meaning" governs the way data is displayed on a graphical user interface [font, color screen location, etc.]. XML employs style sheets in various languages to govern the style of displayed data.) The result is a body of data in XML structured language. Common-structured-language-based conditional decision logic processing is configured to seek particular conditions or states of data. In the XML context, the conditional decision logic is XML-based business logic. The structured data in common-structured-language is applied to the common-structured-language-based conditional decision logic processing to thereby generate an indication of the condition being met. Conversion of data into a common language shared with the conditional business logic facilitates processing which apply the desired user-defined rules for decision support. Commercial off-the-shelf (COTS) tools are available which convert data and store business logic in the XML language.

According to another aspect of the invention, a method for dynamically changing the automated processing behavior of a system supporting decisions made by humans includes the steps of hierarchically organizing conditional decision and simulation logic to (a) interpret and aggregate data on categorized entities, (b) determine interactions between these data entities while applying contingency planning logic, and (c) interpreting the overall situation to provide recommendations. As a last step, system users are allowed to change the conditional decision and simulation logic, thereby resulting in dynamic modification of system processing at different levels of the conditional logic hierarchy, utilizing XML based software services and communications. In a preferred mode of this method, the conditional simulation and logic is commercial off-the-shelf.

A method according to another aspect of the invention is for supporting homeland security decisions made by human users in a maritime context. The method comprises the computer-based steps of accessing data from two or more sources, where the sources include at least one of a ship registry archive, a database of current ship locations andor status, an archive of ship cargo andor crew information, an archive of law enforcement watch lists, weather reports, news, and reference documents. If the data from any of the sources is or are not in structured form, structuring the unstructured data by application of information extraction logic to form structured data, whereby the data from the two or more sources is in structured form. (Since the information extraction logic is also implemented in XML, this specific logic forms part of the overall system decision or business logic). If any portion of the data in structured form is not in XML, the non-XML structured data is processed by conversion of the non-XML structured data to XML to thereby form structured XML data. At a $3^{rd}$ order logic level of XML-based decision logic, relationships within the structured XML data environment are established or evaluated to identify at least potential threat entities. At a $2^{nd}$ order logic level of the XML-based decision logic, entities produced by the $3^{rd}$ order logic are compared to one another within the operational context, applying rules establishing user alerts, to thereby generate a representation of the current situation in XML. At a $1^{st}$ order logic level of the XML-based decision logic, the current situation as represented by the $2^{nd}$ order logic is interpreted in light of user-defined rules, and responses are provided to the users. The responses may include recommendations. In a particularly advantageous embodiment, the representation of the current situation is generated in XML. In another advantageous embodiment, the step of comparing to one another entities produced by the $3^{rd}$ order logic includes the step of applying standard operating contingency plans within the 2nd order logic.

DESCRIPTION OF THE INVENTION

In the context of homeland security, a vast amount of information in the form of archived records is available for evaluation, including those related to criminal activity, court activity and testimony, immigration, driver's licenses and other regulatory licenses, from the military, medical, law enforcement and antiterrorism offices, and many others. In addition to the many potential sources of archived information, there is a constant stream of current information, some of which arises from the abovementioned sources, and other portions of which result from information extraction from news reporting media and other such sources. The ability of a human to evaluate this information is impeded by sheer overload.

Computers should, in principle, be capable of performing many tasks for which they are not presently used. For example, a sufficiently advanced computer system should be capable of receiving commands, sensor inputs, information from inventory, current employee presence and capabilities, and the like, to perform overall control of a factory, including complying with current employee laws as to break times, evaluating an employee's current condition, monitor newspapers, weather reports, and traffic conditions to anticipate material supply delays, and so forth. Similarly, a computer should be capable of aiding in the evaluation of homeland security data.

This level of automation and decision support could not be obtained in the prior art because available programs and tools handle only certain types of information and are specialized in function. In the case of popular commercial search engines, a user can search the web (unstructured data sources) for information, and the tool returns results in the form of documents and websites matching the queries. The searchable data sources are limited, and there is minimal control over configuring the query logic and defining taxonomy-based categories (based on principles of classification). Changes to the business logic dictating how these tools process data must be made manually or the user configurability of the program is limited. Existing tools do not normally search both structured data sources (which change dynamically) and unstructured data sources (which are more static). Although existing software agents and web-crawlers can continually search for information, the user has to manually change the program query and alerting logic to suit the form of the information source. A method according to an aspect of the invention integrates a combination of specialized programs, converts data into a common language or protocol (the XML protocol in one embodiment) which is usable by business software, and dynamically changes the processing logic for a greater level of decision support automation.

Figure 1:
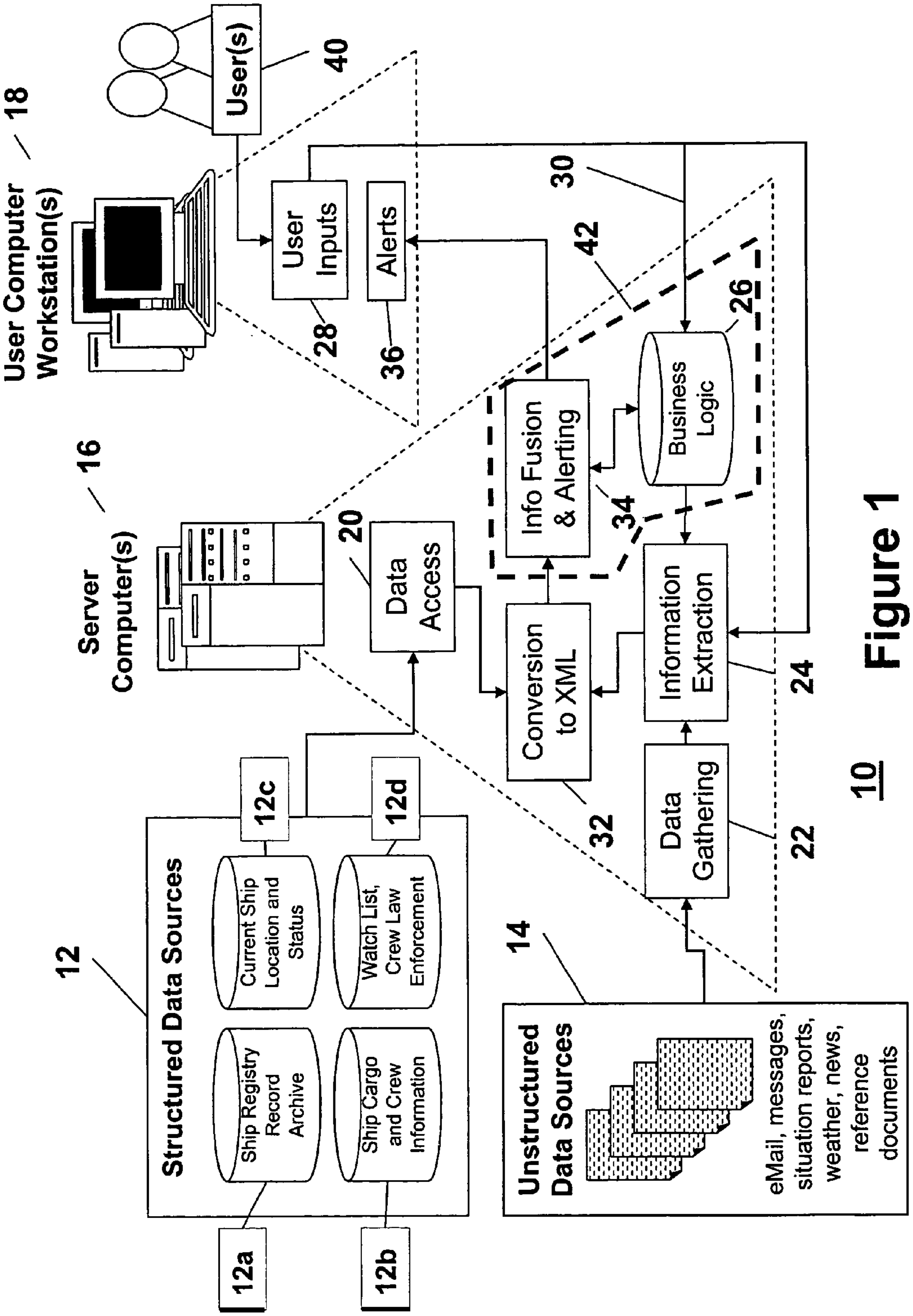
FIG. 1 is a simplified block or functional diagram of an apparatus according to an aspect of the invention.

FIG. 1 is a simplified functional block diagram according to an aspect of the invention. In FIG. 1, a system 10 includes a client-server based computing, architecture which includes structured data sources 12 and unstructured data sources 14. Structured data sources 12 may, in a homeland security context, include commercial shipping and other maritime domain situational awareness data sources, which may be in disparate database formats. Such information may include an archive 12*a* of ship registries, including ship name, ownership, and country of registry. When recorded over a long time, a registry such as 12*a* may be useful in determining the amount of oversight of a ship that has taken place, and thus give some inkling of the potential for its use for terrorism, piracy or smuggling. The various registries represented as 12*a* may be compiled and maintained by various information providers, shipping companies, insurance companies, and/or by commercial maritime and other governmental organizations of the country of registry. To be useful, the various registries of sources 12 and 14 of FIG. 1 must be maintained or updated regularly at the source.

Ship Cargo and Crew Information archive 12*b* of FIG. 1 may be useful in a homeland security context, indicating the presence of hazardous materials and or suspect crewmembers. Such information, together with evidence of historically poor ship safety, as might be determined from other archives, might be useful as an indication that further examination might be in order before allowing a ship into port. Information relating to cargo and crew identities is required by law to be supplied by the ship owner at least 96 hours prior to arrival at the port. Archive 12*c* of FIG. 1 represents information regarding the current status and location of the ship, which should be available from a variety of sources, such as coast guard, harbor control, shipping schedules, and airborne, satellite, or radar surveillance. It should also be available from the ship itself, with great accuracy due to the widespread use of Global Positioning System and Automated Identification System equipment. Under at least some conditions, the ship's location, destination port, and the like may be determinable from intercepted radio communications, or from classified data sources. Data source 12*c* should also include information relating to prior ports of call, either explicitly or at least implicitly by analysis of historic data in conjunction with 12*a*. Data source 12*d* of FIG. 1 represents an archive of watch lists, identifying the names and identification characteristics of suspect persons or terrorists from intelligence sources, felons or other miscreants from law enforcement sources, and crew lists. The data from structured data sources may be made available to an access port or adapter processing within block 20 of one or more server computers, illustrated as 16 in FIG. 1.

Unstructured data sources of block 14 of FIG. 1 represent data which may be relevant, but which arrives or is made available in forms other than databases. Such information might include emails, operational messages, weather reports and forecasts, news or intelligence reports, and reference documents containing standard operating procedures (SOPs). Such information is likely to be in the form of natural language text, although some messages have a pre-established format. Unstructured information is periodically gathered, as suggested by block 22 of server 16 of FIG. 1, and the data so gathered is subject to data extraction by various information extraction techniques, illustrated as a block 24, under the control of instructions from a business logic source 26. The data extraction processing of block 24 under the control of block 26 identifies data such as people, places, and things, and may lead to the discovery of previously unknown associations therebetween.

Since the user inputs are, to at least some extent, likely to be in natural language form, information extraction block 24 may also perform information extraction on queries from user input source 18. The natural language inquiries are input by a user 40 to an input device(es) 28, and the information is conveyed over a path 30 to information extraction block 24. Such processing supports interpretation of questions in natural language such as "Where are those vessels carrying liquefied natural gas?"

The structured data arriving in data access block 20 and the originally-unstructured data converted by information extraction block 24 are converted, if not already in that form, to Extended Markup Language (XML) by a block 32. The XML-language information is then available for processing by information fusion and alerting block 34 of server 16. Block 34 continuously processes the XML-language-formatted data by performing associations and correlations, and compares the data for internal consistency, all under the control of business logic block 26. Business logic block 26 and fusion and alerting block 34 are together designated as 42. In the event that an inconsistency is detected, or if it appears that a vessel is significantly off course for the stated destination, an alert may be "sounded" for human interaction or evaluation. In the case of a ship which is apparently off-course, or otherwise not clearly a threat, the alert may be informational only. An "active" alert may be sounded for some items, such as, for example, arrival of an email message raising the threat condition or the required level of surveillance. This information is maintained in the XML protocol, and the automated processing behavior is dynamic, in that a user input to the business logic block 26 immediately affects the behavior of the information fusion and alerting block 34.

The user(s) 40 of FIG. 1 provide control inputs, shown as an arrow 30, to the business logic block 26, for control of how the natural language is extracted in block 24. The user(s) also control automated system processing including how data items are related or fused, and how the automated alerts are determined in fusion and alert block 34.

According to an aspect of the invention, changes in the data, in conjunction with changes in the human interaction, can dynamically alter the automated behavior of the system, because the business logic of block 26 is in the common XML language or protocol, and because it interfaces with the information extraction of block 24 and processing of information fusion and alerting of block 34.

Figure 2:
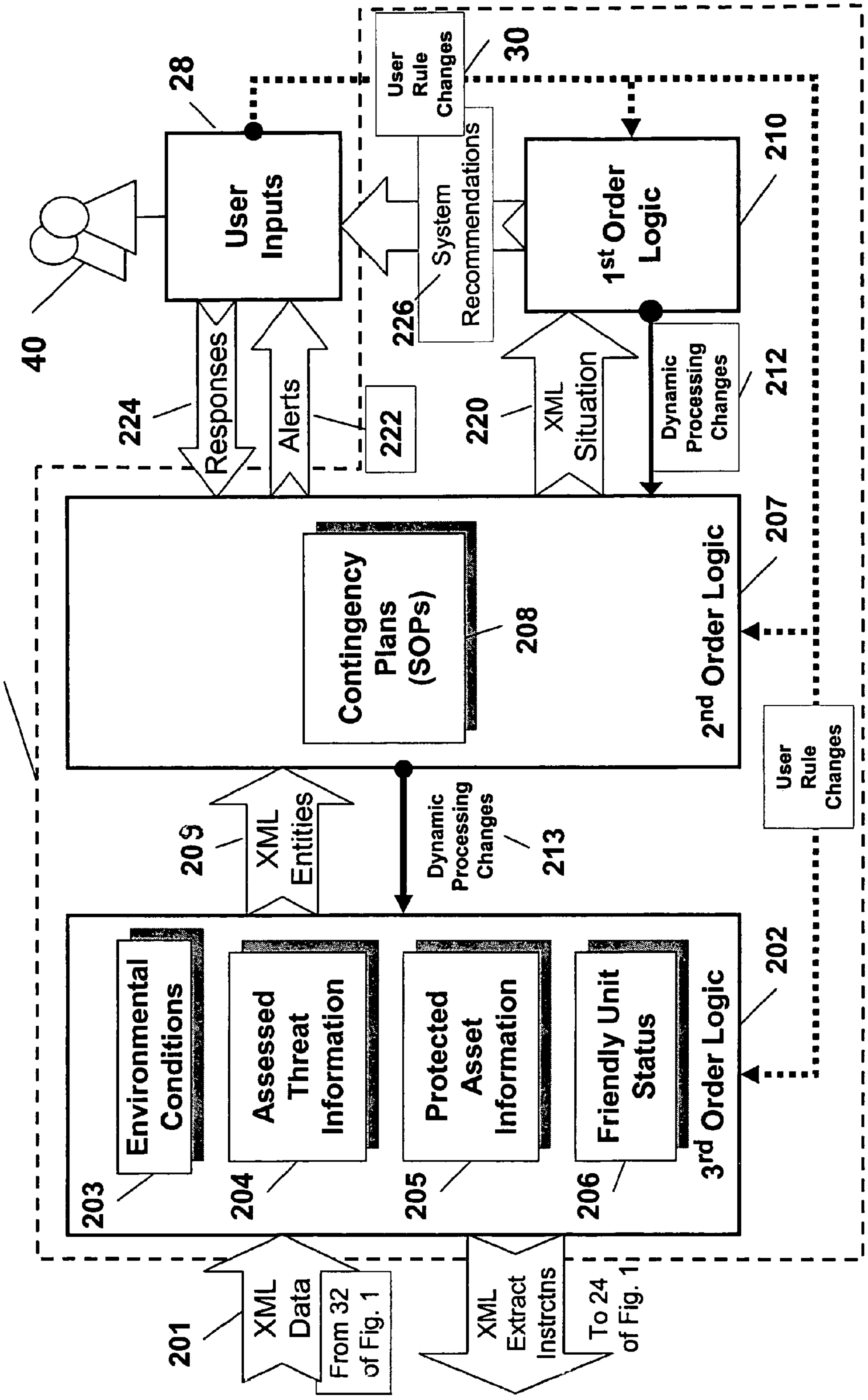
FIG. 2 is a functional block diagram illustrating functions associated with a portion of the arrangement of FIG. 1 depicting how dynamic behavior is implemented according to an aspect of the invention.

FIG. 2 illustrates functional details of the processing of block 42 of FIG. 1, including business logic 26 and fusion and alert logic 34, and more particularly depicts how a method according to an aspect of the invention may be extended so as to have the system dynamically change its automated processing behavior based on human interaction and on entities and events observed or "perceived" in the data environment. FIG. 2 decomposes block 42 of FIG. 1 and shows the type of information applied to the business logic, the organization of the logic, and the outputs of the program underlying the automated system behavior. As mentioned above, the business logic determining the processing behavior is maintained by the system in XML and the interprocess communications are maintained also in XML. By organizing the business logic of the system in a hierarchical fashion, dynamic processing supports the overall operations of friendly forces or agencies known as command, control and intelligence. This method is applicable to both (a) homeland security and defense or (b) traditional military situations, or (c) commercial business or competitive intelligence, and automation provided by the system reduces the workload of operators.

In FIG. 2, data in the common XML language arrives (arrow 201) at a block 202, representing third-order logic. Third-order block 202 gathers and aggregates the raw data from the sources to create discrete entities (or data "objects" manifested by the software). At this lowest level of processing, decisions are made on how to automatically gather all related information forming the entities, and the importance and relevance of these entities are prioritized based on user rules underlying the business logic. At this third-order level the system logic may, for example, maintain updated information on people, places, and things of interest which are found in the data environment, and continually characterize these entities based on aggregated data. Temporal aspects may be included at this level, and modeling and simulation processing within the business logic may be employed to predict future entity states. For example, moving vessel locations can be projected ahead in time based on current course, speed, and itinerary (known destinations). Detailed and realistic predictive modeling of entity behavior also requires environmental inputs independent of the entity (e.g. weather conditions) provided by block 203 in FIG. 2. Information gathered from the data environment, including how to interpret and convert natural language into XML (depicted by the XML Extraction Instructions arrow to block 24 on FIG. 1), is filtered based on relevance to user needs and the geospatial area of interest, and then formed into logical categories supporting subsequent processing within block 202.

Blocks 203, 204, 205, and 206 in 3$^{rd}$ order processing block 202 of FIG. 2 represent environmental conditions, assessed threat information, protected or defended asset information and friendly unit status, respectively. Processing further defines the operational environment allowing higher order processing. Environmental conditions within the area of interest consisting of marine meteorological information (precipitation, wind speed and direction, tides, etc.) are maintained in XML. In the case of assessed threat information, relationships within the available data environment are established and evaluated for potential threat entities. These threat entities may be vessels containing suspect crew members or hazardous cargo, or in the traditional military sense, an enemy armor unit on the move. Defended assets may be a nuclear power plant or a city. In a homeland security situation, friendly unit or 1$^{st}$ responder status might include the location of a USCG cutter on patrol, together with its projected course within a patrol area. In a traditional military application, this category of entity may be embodied in the program by a friendly "unit of execution" having an overall readiness score comprising personnel and logistic readiness levels, determined by the processing logic in block 202. The resulting entities are made available in XML form to second-order processing 207, as suggested by arrow 209.

In FIG. 2, block 207 depicts the 2$^{nd}$ order logic that relates the categorized entities to one another within the operational context, applies the user-defined rules establishing user alerts (as described above) supporting situational awareness, and outputs the situation represented in XML to higher order processing, as suggested by arrow 220. In this context, situational awareness combines what is currently known as Common Operational Picture (COP) with what is currently known as the Common Intelligence Picture (CIP). To support higher-level decision making, this situational awareness information is processed by the system 2$^{nd}$ order logic combining threat, defended asset and friendly unit status information, thereby permitting the application of doctrine, contingency plans or standard operating procedures (SOPs), shown in Block 208.

The Contingency Plans and SOPs depicted in Block 208, implemented in the XML language, represent "perfect world" organizational rules continuously applied to the current situation as received from (or input from) 3$^{rd}$ or lower order processing. These rules represent established organizational procedures and actions to be taken based on the situation or events as identified by lower order logic processing, as described above. A contingency plan may be represented simply by a statement reflecting a standard operating procedure, for example: "Take Actions (A1) and (A2) when Threat (X) is within range (R1) of Defended Asset (D), if there are no Friendly Units (U) within (range R2) of Defended Asset (D). Conversion of SOPs from natural language documents to XML is described above in conjunction with block 32 of FIG. 1. This method of generating the situation does not preclude the traditional geospatial visualization of the overall operational situation (COP and CIP) for user awareness, but the processing depicted in Block 208 continually applies these organizational rules to the interacting entities, and outputs the results as XML situation 220 and user alerts 222.

The 2$^{nd}$ order logic depicted by block 207 of FIG. 2 processes "active" and "passive" triggers based on user defined rules manifested in the XML protocol, and outputs messages 220 to higher (1$^{st}$) order logic 210, and also outputs alerts 222 as depicted in FIG. 2. Examples of a geospatial passive triggers would be a change of course of a moving threat, the approach of a threat to a defended asset, a merchant vessel venturing outside a shipping lane (in this case the system processing priority would be based upon the assessed threat information, with the shipping lane considered as a defended asset), or a friendly unit/1$^{st}$ responder USCG cutter unexpectedly at zero velocity. Examples of active triggers in the homeland defense environment might include receipt of an email message which dictates a change in the maritime security level, receipt of an indication and warning message, or even report of an oil spill (established as a new threat entity by the system). Applied to a traditional military scenario, an active trigger might be a notification of an enemy attack or a receipt of an operations order. Triggers generate alerts applied over a path 222 for human interaction, shown as an output to the users 40 in FIG. 2. As in the 3$^{rd}$ order logic, temporal aspects may also included at the 2$^{nd}$ order level, and modeling and simulation processing within the system business logic may again be employed to show or predict future situational states. At the 2$^{nd}$ order level, interaction between the entities may be modeled to show an aggregated situational awareness state 220. This processing uses the results of the individual entity modeling output by block 202, applying environmental conditions.

The 2$^{nd}$ order logic depicted by block 207 of FIG. 2 processes user responses to the overall operational situation and system alerts, as suggested by responses input 224 from block 28 of FIG. 2. User responses are processed by the system and applied in much the same manner as the rules 208 representing the contingency plan. User responses 224 are processed by the system to maintain state of the expected operator workflow. As part of the overall situation, the system tracks the status of the alerts (whether the operator acknowledges the alert or not, or takes actions adhering to the standard operating procedures) as recommended by the system using higher-level processing.

The 1$^{st}$ order logic depicted in block 210 of FIG. 2 accepts the situational state applied by the system to the established contingency plans, as suggested by arrow 220. The 1$^{st}$ order logic provides response recommendations 226 to the user for disposition based on user-defined rules. The 1$^{st}$ order processing 210 interprets the situational state 220 it receives. For example, if a hazardous chemical spill occurs in a sensitive area, the system might recommend dispatch of containment units (based on 2$^{nd}$ order logic) but additionally prescribe a "keep-out" zone based on the nature of the chemical, and recommend specific response units that are available and suitably equipped to deal with the situation. The 1$^{st}$ order logic is also used to characterize the situation overall and provide high-level recommendations that may not be contained in established documented contingency plans or SOPs but which are based on understood operational rules, such as an establishing increased level of alert when the ratio of assessed threats to friendly units within the area of operations surpasses an pre-established number. Within a software-agent-based implementation, dynamic system processing behavior is obtained by a software hierarchy of user-configurable software agents. The 1$^{st}$ order logic agents (not specifically illustrated) associated with block 10 control the agents (not illustrated) processing the 2$^{nd}$ order logic depicted in block 207, which in turn, control the 3$^{rd}$ order agents (not illustrated) in block 202. A major advantage of an arrangement as described in conjunction with FIGS. 1 and 2 is that reprogramming the system via recompiling recoded software is not required in response to new operational requirements, modified contingency plans, and new available data sources. Only changes in the processes rule underlying the business logic are required. This may be considered to be dynamic behavior in response to user commands and the perceived environment.

The dynamic behavior associated with the arrangement of FIGS. 1 and 2 may be better understood by the use of an example. In the event that the ratio of assessed threats to friendly units in the area of operation exceeds or passes an established level, the 1$^{st}$ order logic 210 outputs a response recommendation 226 to increase the security level. The user 40 would acknowledge this recommendation by means of a user rule change depicted by flow 30 in FIG. 2, which changes the $1^{st}$ order processing logic within block 210. Changes at this $1^{st}$ order level might involve processing the XML situational state more frequently or expanding the workflow monitoring based on more user roles. In accordance with the higher security level, a dynamic processing change 212 is output from $1^{st}$ order block 210 to block 207 by means of inter-agent communications, where an agent commands a change to the second order processing 207.

When an intelligent agent (or agents) within block 210 receive communications from the user or operator 40, processing is changed based on the higher security level. Contingency plan-based rules depicted by block 208 are modified as described above based on the existing logic, and in such a situation, additional rules may be put into effect. The above-described method by which user alerts are generated might also be changed. For instance, passive triggering might be made more sensitive, and asset threat ranges to assets generating alerts might be increased. The XML situation output to the $1^{st}$ order logic of block 210 would also be modified based on the processing changes in accordance with the changed rule set. In hierarchical fashion, a dynamic processing change is output to block 202 as depicted by flow 213, by means of inter-agent communications, where an agent "commands" a change to the third order processing. This may be implemented by changing existing software agent processing or by activating other software agents.

The 3rd order logic implemented within block 202 of FIG. 2 would change based on an increased threat level and operating procedures corresponding to the current threat level. Changes to the logic would modify the entity based processing. For instance, the higher threat level could change the gathering and aggregation of the assessed threat information depicted in block 204, possibly increasing the number of searched data sources and the processed relationships. The logic behind processing defended asset entities shown in block 205 would also be modified; the number of defended assets and types of defended assets would be increased. The constellation of friendly units processed by the system within block 206 of FIG. 2 would also be augmented based on the increased threat level which causes activation of additional units within the area of operations.

The concept of hierarchical logic depicted in FIG. 2 is not limited to dynamically changing the automated processing behavior only from the "top down" as described in the preceding paragraphs. With a user-configurable software agent-based implementation aspect of the invention, a user has the ability to directly modify the second or third order logic as shown by arrow 30 in FIG. 2, which could also dynamically change the processing overall. Instead of the higher order logic changed by the user controlling the lower order logic, the user could directly change the lower order logic. Modification to this lower order logic would impact the data inputs to the higher order logic, and the processing at this higher level. For example, if the user modified the threat assessment criteria of block 204 to be more stringent, or defended assets in block 205 to be more vulnerable in the $3^{rd}$ order logic of block 202, more entities would be processed by $2^{nd}$ order block 207 and the XML situation input 220 into the $1^{st}$ order logic of block 210 would change. With more threats, the ratio of assessed threats to friendly units within the area of operations might exceed the aforementioned pre-established threshold, thereby affecting the system as a whole in the manner described above. Therefore, the arrangement of FIGS. 1 and 2 advantageously supports dynamic behavior from all levels within the established logic hierarchy.

According to an aspect of the invention, human decision making is supported by modeling and simulation at each level, projecting the situation ahead in time as previously mentioned. The $3^{rd}$ order logic represented by block 202 of FIG. 2 simulates the behaviors of individual entities continuously gathered from the data environment. The $2^{nd}$ order logic represented by block 207 simulates the interaction between the entities to establish relationships between the entities, and based on the contingency planning 208 depicted in block 207, provides a projection of the "normal" situation based on standard operating procedures, applying the specified or approved courses of action. At the highest level of data aggregation, the $1^{st}$ order logic in block 210 also permits simulation, providing the user with a "what if" capability based on the XML situation input to it. In this regard, business logic when used in block 210 combines decision logic and simulation rules. Simulation rules include how the entities individually behave, how they are expected to interact with one another in the environment, what will happen based on the course of normal operations, and finally the effects of different courses of action supporting user decisions. A major advantage of business logic for this application is that it is available in a commercial off-the-shelf (COTS) form. (By being nonproprietary and easy to process [read and write], XML facilitates for interchange of data among the different COTS applications embodied in this system. Integration of data from multiple sources is facilitated by the use of XML, which provides multiple mechanisms and approaches to accomplish this.)

According to an aspect of the invention, a method for supporting decisions made by humans comprises the steps of accessing data from two (12, 14) or more sources, and, if the data so acquired includes unstructured data, as for example from natural language, structuring the unstructured data by application of information extraction logic (24). Thus, all the acquired data is in a structured form in a common language provided by the structural and semantic meaning based on the XML mark up. If the structured data is not in a common structured language, the structured data is converted into XML (32) by conversion of the structured data schema to a common XML schema for processing. In a preferred embodiment of this aspect of the invention, the preferred structured language is XML, which is currently the most commercially prevalent. The result is a body of uniformly structured data in XML. Common-structured-language-based conditional decision logic (42) processing is configured to seek particular conditions or states of data. In the XML context, the conditional decision logic is XML-based business logic, which may be commercial off-the-shelf. The structured data in common-structured-language is applied to the common-structured-language-based conditional decision logic processing (42) to thereby generate an indication of the condition being met.

According to another aspect of the invention, a method for dynamically changing the automated processing behavior of a system supporting decisions made by humans includes the steps of hierarchically organizing conditional decision and simulation logic (42) to (a) interpret and aggregate data (20, 22, 24, 32) on categorized entities, (b) determine interactions between these data entities (202) while applying contingency planning logic (207), and (c) interpreting the overall situation (210) to provide recommendations (226). As a last step, system users are allowed to change the conditional decision and simulation logic at all levels of the business logic hierarchy. A simple change of logic at the highest level would thereby result in dynamic modification of system processing at different levels of the conditional logic hierarchy, utilizing XML based software services and communications. In a preferred mode of this method, the conditional simulation and decision logic is embodied within commercial off-the-shelf environments.

What is claimed is:

1. A method for supporting homeland security decisions made by human system users in a maritime context, said method executed by a client-server based computing architecture comprised of one or more server computers and one or more user computers, said method comprising the computer-based steps of:

said server computers accessing data from two or more sources, said two or more sources including one or more structured data sources and one or more unstructured data sources;

where said data from any of said sources is not in structured form, structuring the unstructured data by application of information extraction logic to form structured data, whereby said data from said two or more sources is in structured form;

where any portion of said data in structured form is not in XML, processing the non-XML structured data by conversion of said non-XML structured data to XML to thereby form structured XML data;

said server computers hierarchically organizing conditional decision and simulation logic to:

(a) at a 3rd order logic level of XML-based decision logic, establishing and evaluating relationships within the structured XML data environment for at least potential threat entities;

(b) at a 2nd order logic level of said XML-based decision logic, comparing to one another entities produced by said 3rd order logic within the operational context, applying user-defined rules establishing user alerts, to thereby generate a representation of the current situation in XML; and (c) at a 1st order logic level of said XML-based decision logic, interpreting the current situation as represented by the 2nd order logic in light of said user-defined rules, and providing recommendations to the system users; and allowing the system users to change the conditional decision and simulation logic, thereby resulting in dynamic modification of system processing at different levels of the conditional logic hierarchy, utilizing COTS XML based software services and communications.

2. A method according to claim 1, wherein said step of comparing to one another includes the step of:

comparing to one another entities produced by said 3rd order logic within the operational context, applying user-defined rules establishing user alerts, to thereby generate a representation of the current situation in XML.

3. A method according to claim 1, wherein said step of comparing to one another entities produced by said 3rd order logic includes the step of applying standard operating contingency plans.

4. A method according to claim 1, wherein said step of interpreting the current situation includes the step of recommending actions to the users.

5. A method according to claim 1, wherein said step of structuring the unstructured data by application of information extraction logic to form structured data includes the step of structuring the unstructured data by application of information extraction logic to form structured data having semantic meaning, whereby said data from said two or more sources is in structured form with semantic meaning.

6. A method according to claim 1, wherein said step of processing the non-XML structured data by conversion of said non-XML structured data includes the step of processing the schema of the non-XML structured data by conversion of said non-XML structured data to XML to thereby form structured XML data.

* * * * *

UNITED STATES PATENT AND TRADEMARK OFFICE

CERTIFICATE OF CORRECTION

PATENT NO. : 7,587,404 B1
APPLICATION NO. : 11/032741
DATED : September 8, 2009
INVENTOR(S) : Paul D. Albertelli, Jr.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1185 days.

Signed and Sealed this

Twenty-first Day of September, 2010

David J. Kappos
*Director of the United States Patent and Trademark Office*